Figure 1:
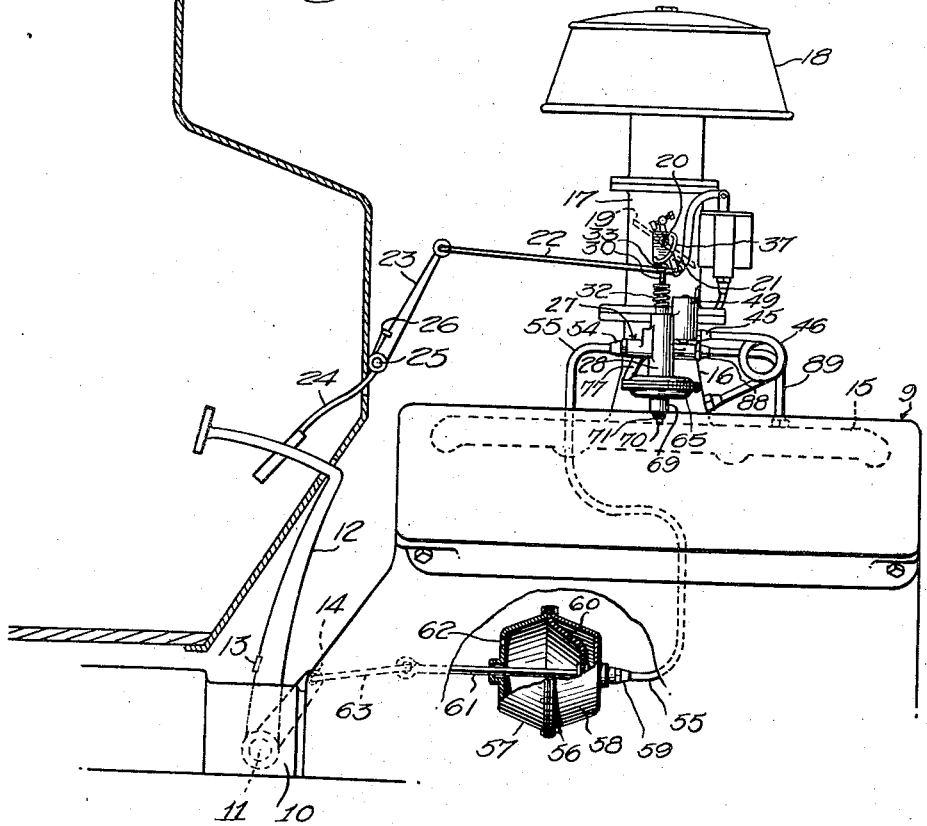

Dec. 26, 1939. E. G. HILL 2,184,616
CLUTCH CONTROL MECHANISM FOR MOTOR VEHICLES
Original Filed March 22, 1935 2 Sheets-Sheet 1

Inventor
E. G. HILL
By C. L. Parker Jr.
Attorney

Dec. 26, 1939.   E. G. HILL   2,184,616
CLUTCH CONTROL MECHANISM FOR MOTOR VEHICLES
Original Filed March 22, 1935    2 Sheets-Sheet 2
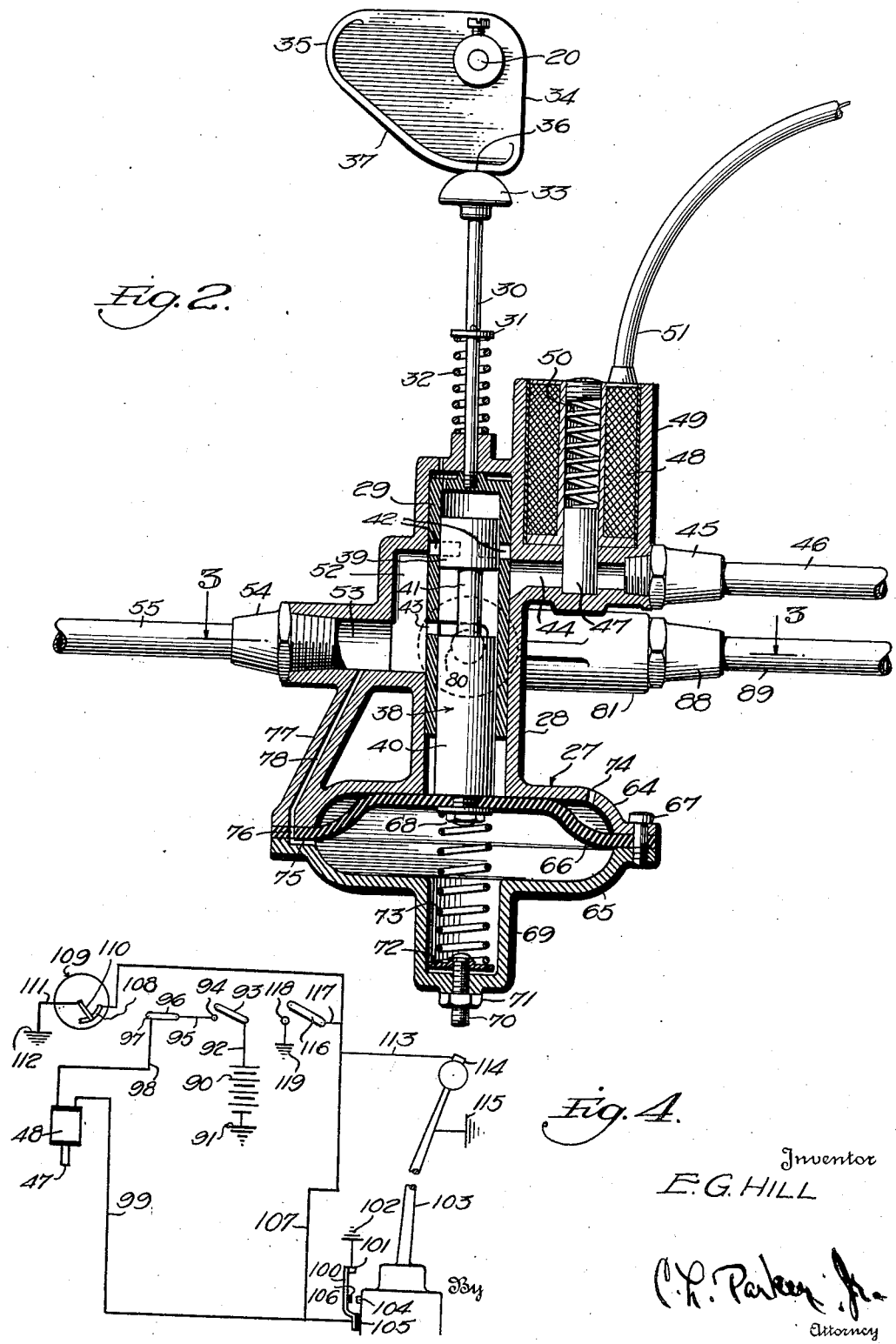
Inventor
E. G. HILL
C. L. Parker Jr.
Attorney Patented Dec. 26, 1939

2,184,616

UNITED STATES PATENT OFFICE

2,184,616

CLUTCH CONTROL MECHANISM FOR MOTOR VEHICLES

Edward G. Hill, Richmond, Va., assignor to Hill Engineering Corporation, Richmond, Va., a corporation of Virginia Application March 22, 1935, Serial No. 12,501
Renewed May 15, 1939

18 Claims. (Cl. 192—.01)

This invention relates to clutch control mechanism for motor vehicles, and is an improvement over the structures shown in my prior Patent No. 1,964,693, granted June 26, 1934, and copending application Serial No. 709,650, filed February 3, 1934.

In each of the prior constructions referred to I have proposed to employ a vacuum operated power device for disengaging the clutch of a motor vehicle and controlled by a novel type of valve mechanism which was operative to provide extremely rapid clutch disengagement and to provide smooth clutch reengagement without any jerking or lunging of the vehicle. Such novel valve mechanism is described and claimed in my prior patent referred to, and the operation of such valve mechanism accurately simulates conventional clutch operation under numerous conditions. For example, such valve mechanism accurately checks the movement of the clutch elements as they approach operative position, depending upon the mode of operation of the accelerator pedal. For example, if the accelerator pedal is depressed relatively slowly, the clutch elements will be checked substantially at the point of initial engagement, but will be checked slightly later if the accelerator pedal is depressed more rapidly, and such operation exactly follows the conventional operation of a vehicle clutch pedal. Moreover, such construction eliminates the necessity for adjusting the point at which the clutch elements will be checked, since the checking action is dependent upon actual contact of the clutch plates.

The functioning of the valve mechanism referred to further contemplates the progressive releasing of the clutch plate pressure upon the progressive releasing of the accelerator pedal toward idling position in order to prepare the power mechanism for instantaneously disengaging the clutch when the accelerator pedal reaches idling position, thus preventing any drag from being transmitted from the motor to the vehicle driving wheels. This progressive releasing of the clutch plate pressure, however, was dependent upon the torque reaction on the motor as reflected in the pressure in the intake manifold, and accordingly the releasing of the clutch plate pressure would not take place to such an extent as to cause any slippage of the clutch and undue wearing thereof.

The main valve mechanism described and claimed in my prior patent, therefore, is highly advantageous over prior constructions, but does not take care of every desirable condition. For example, while such valve mechanism operates to check the movement of the clutch elements at progressively later points in accordance with the progressively more rapid opening movement of the engine throttle, such progressive action can check only up to a certain point beyond which grabbing of the clutch elements takes place. This is prevented in the prior construction referred to by providing what is termed a "second check valve" which operates independently of the main valve mechanism to check the movement of the clutch elements if the accelerator pedal is depressed too rapidly.

Moreover, while the valve mechanism disclosed in my prior patent referred to was highly advantageous for use in shifting gears, it was found that when the device was used as a free wheeling device at substantial vehicle speeds, the depression of the accelerator pedal, when returning to normal operation, would result in full engagement of the clutch plates very slightly prior to the time at which the motor would accelerate to a speed corresponding to vehicle speed. This slight lack of synchronism between clutch engagement and the acceleration of the motor speed took place only in a certain range of speeds, and this fault was corrected by the mechanism disclosed in my copending application referred to, Serial No. 709,650. In such mechanism, a "free wheeling" valve was controlled by the degree of vacuum in the intake manifold to act as a check on the second check valve in the range of vehicle speeds referred to in which the slight jerking action took place, thereby retarding clutch engagement in such range of speed to permit the vehicle engine to accelerate to the proper speed before full clutch engagement takes place.

An important object of the present invention is to provide a novel type of control valve mechanism for clutch operating devices wherein all of the functions of the several devices previously referred to are carried out in a single mechanism.

A further object is to provide a main control valve mechanism which is operative for controlling the rate of clutch engagement upon the depression of the accelerator pedal provided the rate of clutch engagement does not exceed a predetermined relationship with respect to the torque load on the engine, and to provide an automatic valve operative if such predetermined relationship is exceeded for taking the controlling of the rate of clutch engagement away from the main valve mechanism to prevent the too rapid engagement of the clutch elements.

A further object is to provide an auxiliary valve of the character referred to which is responsive to variations in the torque load by being made operative in accordance with variations in the degree of vacuum in the intake manifold.

A further object is to provide a valve mechanism of the character indicated which functions automatically in the several gear shifting operations for preventing the too rapid engagement of the clutch elements, and which functions automatically to provide smooth clutch engagement when returning to normal operation after free wheeling.

A further object is to provide a valve mechanism which includes a single valve automatically operative for performing the functions of the second check valve and free wheeling valve referred to.

A further object is to provide such an automatic valve which functions upon the relatively rapid operation of the accelerator pedal to graduate the rate of clutch engagement in accordance with torque loads instead of providing a fixed rate of clutch engagement as is true in the case of the second check valve referred to.

In the drawings I have shown one embodiment of the invention. In this showing—

Figure 3:
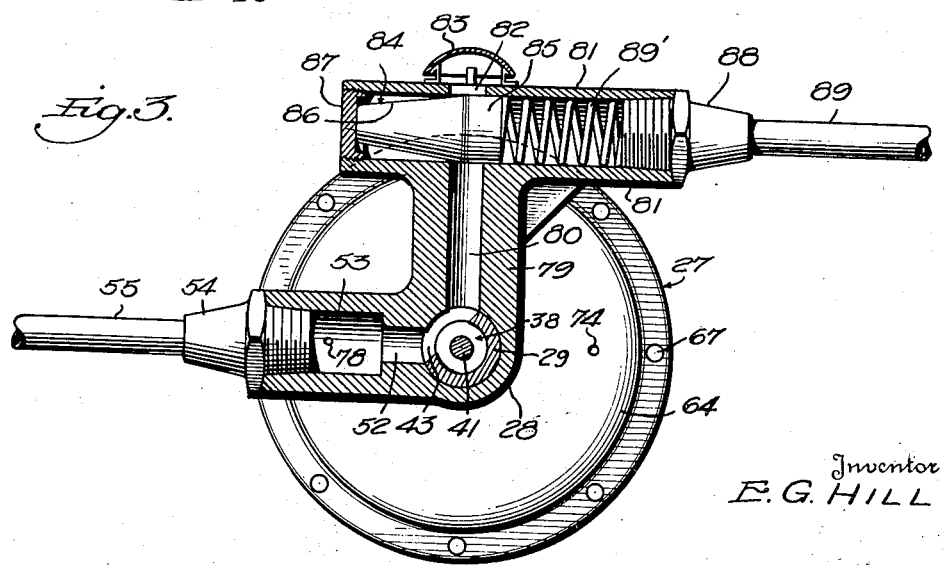

Figure 1 is a side elevation of a motor vehicle engine and associated parts showing the invention applied, parts being broken away, Figure 2 is a central vertical sectional view through the valve mechanism and associated elements, parts being shown in elevation, Figure 3 is a detail sectional view on line 3—3 of Figure 2, and, Figure 4 is a wiring circuit adapted for use in connection with the apparatus.

Referring to Figure 1, the numeral 9 designates the engine of a motor vehicle having the usual clutch 10 operated through the medium of a rock shaft 11. This shaft is conventionally operated by means of a clutch pedal 12. In the present instance, this pedal is loosely mounted on the shaft 11 and is provided with a lug 13 engageable against an arm 14, secured to the shaft 11, whereby it will be apparent that depression of the pedal 12 by the foot will effect clutch disengagement.

The engine illustrated in Figure 1 is of the V-type and the usual manifold 15 is arranged between the two lines of cylinders and provided with an upwardly extending inlet conduit 16 to the upper end of which is connected a carburetor 17. The air inlet of the carburetor is indicated as being provided with an air cleaner 18.

The carburetor includes the usual butterfly throttle valve 19 carried by a shaft 20 projecting outwardly from the carburetor. An operating arm 21 is connected to the shaft 20 and is pivotally connected at its end to one end of a link 22. The other end of this link 22 is pivotally connected to an arm 23 forming one end of a lever, the other end 24 of which constitutes the accelerator pedal. The pedal and arm 23 are pivotally supported as at 25 and a return spring 26 engages the arm 23 to urge the throttle toward closed position.

The device forming the subject matter of the present invention comprises a valve housing indicated as a whole by the numeral 27. This housing includes a cylindrical main valve casing 28 in which a sleeve valve 29 is vertically reciprocable. A stem 30 is connected to the upper end of the valve 29 and projects upwardly a substantial distance above the valve casing, as clearly shown in Figure 2. A disk 31 surrounds the stem 30, and a compression spring 32 is arranged between this disk and the top of the casing 28 to urge the valve 29 toward its uppermost position, as shown in Figure 2. The upper end of the stem 30 is provided with a head 33 operable by a cam indicated by the numeral 34 and secured to the valve shaft 20. This cam includes high and low portions 35 and 36 respectively, connected by a graduated intermediate portion 37. The portion 36 of the cam is concentric with the axis of the shaft 20, and when such portion of the cam is in engagement with the head 33, the throttle is in its range of movement adjacent the fully open position. When the throttle is closed, the high point 35 of the cam engages the head 33 to maintain the valve 29 in its lowermost position.

A second valve 38 is slidable within the valve 29. The valve 38 is provided with upper and lower heads 39 and 40 spaced from each other and connected by a reduced shank 41. The valve 29 is provided with upper opposite arcuate ports 42 and a lower arcuate port 43, and the inner limits of the ports 42 and 43 are spaced apart a distance substantially equal to the distance between the valve heads 39 and 40, that is, a distance substantially equal to the length of the shank 41. Accordingly it will be apparent that the two valves 29 and 38 are adapted to assume positions with respect to each other in which the ports 42 and 43 are disconnected from the port surrounding the shank 41.

At one side, the valve casing is provided with a radially extending passage 44 to the end of which a union 45 is connected. A pipe 46 connects this union to the vertical intake pipe 16. A valve 47 is movable downwardly to close the passage 44. This valve forms the armature of a solenoid 48 arranged in the casing 49 preferably formed integral with the valve housing 27. A light spring 50 urges the valve 47 downwardly and the valve is movable to open position upon the energization of the solenoid 48. Wires leading to this solenoid may be contained within a cable 51.

When the valve 29 is moved downwardly to bring the ports 42 into registration with the space around the shank 41, communication will be afforded between the passage 44 and an opposite port 52 elongated longitudinally with respect to the valve 29 to bridge across both ports 42 and 43 when the device is in operation. The port 52 communicates with a passage 53 in the outer end of which is threaded a union 54. One end of a conduit 55 is connected to the union 54. The other end of this conduit leads to a power device indicated as a whole by the numeral 56. This power device is operative for disengaging the clutch and may be of any desired type, preferably of the vacuum operated type disclosed in my prior patent and copending application referred to. Such power device includes a pair of casing sections 57 and 58, to the latter of which the conduit 55 is connected by a union 59. A diaphragm 60 is clamped between the casing sections and is connected to a shaft 61 extending from the casing section 57. The latter casing section is vented to the atmosphere as at 62, when the device is suction operated. The free end of the shaft 61 is connected to one end of a cable or other corresponding element 63, and the upper end of this element is connected to the upper end of the arm 14.

A pair of annular casing sections 64 and 65 is arranged at the lower end of the valve casing 27, the casing section 64 preferably being formed integral therewith. A diaphragm 66 is clamped between the casing sections 64 and 65 by means of screws 67 passing through the edge portions of the casing sections. The lower end of the valve 40 is secured to the diaphragm 66 centrally thereof by means of a nut 68. The lower casing section 65 is provided with an axial extension 69 in the end of which is threaded an adjusting screw 70 secured in adjusted position by a lock nut 71. Within the extension 69, a spring seat 72 is mounted on the screw 70, and a compression spring 73 is arranged between the spring seat and the diaphragm 66 to urge the latter upwardly.

The casing section 64 is vented to the atmosphere as at 74, and means is provided for establishing pressure differential on opposite sides of the diaphragm 66 to operate the valve 38. The casing section 65 is provided adjacent its edge portion with a small port 75 communicating with a port 76 extending through the diaphragm 66. The housing 27 is provided with a preferably integral member 77 in which is formed a passage 78 communicating at one end with the passage 53 and at the opposite end with the passage 76. Thus it will be apparent that the chamber formed between the diaphragm 66 and the casing section 65 will be subject at all times to the pressure present in the passage 53.

The casing 28 is provided with a lateral extension 79 having a passage 80 extending therethrough, and the passages 53 and 80 preferably lie in a common plane transversely of the valve casing 28. The passages 53 and 80 communicate with the valve port 43, as clearly shown in Figure 3. An auxiliary valve casing 81 is preferably formed integral with the extension 79 and extends transversely thereof at its outer end, as shown in Figure 3. The valve casing 81 is provided with an atmospheric port 82 arranged in alinement with the passage 80 and preferably provided with a dust cap 83.

Means are provided for governing the degree of communication between the passage 80 and the atmosphere through the port 82. An auxiliary valve 84 is arranged within the casing 81. The valve 84 includes a cylindrical portion 85 at one end fitting and sliding within the casing 81. From such cylindrical portion the valve tapers toward its other end as at 86. The end of the casing 81 adjacent the tapered end of the valve 80 is provided with a plug 87 to limit the movement of the valve 84. A union 88 is threaded in the other end of the casing 81, and a compression spring 89' is arranged between this union and the cylindrical end 85 of the auxiliary valve to urge the latter toward the left as viewed in Figure 3. A conduit 89 has one end connected to the valve 88 and its other end tapped into the main portion of the manifold 15, as indicated in Figure 1.

A simple form of wiring diagram for the device is illustrated in Figure 4. The vehicle is provided with the usual battery 90 grounded at one side as at 91 and having its other side connected as at 92 to the ignition switch 93. This switch is engageable with the usual contact 94 leading to the ignition system (not shown) of the vehicle. The contact 94 is also connected by a wire 95 to a control switch 96 engageable with a contact 97, and this contact is connected by a wire 98 to one terminal of the solenoid 48. The other terminal of this solenoid is connected by a wire 99 to a switch element 100 normally urged toward engagement with a contact 101, grounded as at 102. The vehicle is provided with the usual gear shifting mechanism (not shown) controlled by a gear shift lever 103 and including a high gear shift rod 104. The switch element 100 is supported with respect to the transmission by an insulating block 105, and a similar block 106 is engageable by the shift rod 104 when the vehicle is in high gear to move the switch element 100 out of engagement with the contact 101.

One end of a wire 107 is tapped into the wire 99 and has its other end connected to an arcuate contact 108, preferably forming a part of the vehicle speedometer 109. The speedometer includes a brush 110, movable in accordance with vehicle speed, and engageable with the contact 108 when the vehicle is traveling below a predetermined speed, such for example, as 10 miles per hour. A wire 111 connects the brush 110 to the ground as at 112.

A wire 113 leads from the wire 107 to a push button 114 arranged on the upper end of the gear shift lever and normally arranged in open position. The gear shift lever is grounded as at 115, whereby it will be apparent that the wire 113 is grounded when the push button 114 is operated. A manually operable switch 116 is connected to the wire 107 as at 117, and is movable into engagement with a contact 118, grounded as at 119.

The operation of the apparatus is as follows:

Assuming that the vehicle is at a standstill, the parts of the apparatus will be in the positions indicated in Figure 1. The accelerator pedal is released and the parts wil be in idling position and the high point 35 of the cam will be holding the stem 30 and valve 29 downwardly at their lower limits of movement. Under such conditions, the ports 42 will afford communication between the passage 44 and port 52 around the stem 41. At the same time, the port 43 will be arranged below the top of the valve head 40. Under such conditions it will be apparent that the passage 53, and hence the chamber within the casing section 58 of the power device, will be connected to the intake manifold 16, assuming that the valve 47 is open, while the power device will be disconnected from the passage 80, and hence will be disconnected from the atmosphere. The valve 38 will also be in its lower position, since the vacuum present in the passage 53 will be communicated through passages 75, 76 and 78 to the chamber within the lower casing section 65. Thus the clutch will be disengaged, and the operator is ready to start the vehicle.

The gear shift lever then may be placed in low gear position, whereupon the operator may depress the accelerator pedal 24 in accordance with the usual practice. This operation rotates the cam 34 as the throttle opens, and the high point 35 of the cam will pass out of contact with the head 33, whereupon the latter will start to move upwardly by engaging the intermediate cam portion 37. The stem 30 and valve 29 accordingly will start to move upwardly, whereupon the ports 42 will pass slightly above the lower limit of the valve head 39, while the port 43 will move slightly above the upper limit of the valve head 40. Under such conditions, assuming that the accelerator is operated in accordance with the normal practice, a substantial degree of vacuum will be present in the manifold 15, and such vacuum will be communicated to the interior of the valve casing 81 through pipe 89 to hold the valve 84 toward the right of its position shown in Figure 3. Thus air will be admitted into the power device through ports 82, 80, 43, 52 and 53 and conduit 55.

In accordance with the usual practice, the clutch is biased toward engaged position, and as air is permitted to flow into the power device, the clutch elements will move toward engaged position under the influence of the clutch spring. The movement of the clutch elements referred to exerts a substantial pull on the diaphragm 60 of the power device, causing such element to act somewhat in the nature of a vacuum pump to prevent the admission of air into the system from raising the pressure therein to any great extent. The partial vacuum still retained in the system will depend upon three elements, as described in detail in my copending application referred to. These three elements are the degree of communication with the atmosphere as controlled by the port 43, the area of the diaphragm 60 and the rate of movement of such diaphragm under the influence of the clutch spring. The partial vacuum thus maintained in the system operates to maintain a sufficient pressure differential on opposite sides of the diaphragm 66 to prevent upward movement of the valve 40, and this valve will be momentarily retained in its lowermost position.

The relationship between the three elements referred to which determine the degree of vacuum in the system when the accelerator is initially depressed will be altered upon the initial light contact of the clutch elements, since the movement of the diaphragm 60 will be retarded. The result of this action is to cause a slight increase in pressure in the system, and this increase in pressure is communicated to the atmosphere within the lower diaphragm casing 65, thus sufficiently reducing the pressure differential on opposite sides of the diaphragm 66 to permit the spring 73 to move the valve upwardly to cause the upper end of the valve head 40 to close the port 43. At this time, assuming that the accelerator pedal is initially depressed and then stopped, no further air will be admitted into the system, and the movement of the clutch elements will be arrested substantially at the point of initial engagement.

If the accelerator pedal is then further depressed relatively slowly, the valve 29 will move slowly upwardly, thus again slightly opening the port 43 to admit additional air into the power device at a relatively slow rate, thus moving the clutch elements to a position beyond initial light contact toward a position of complete operative engagement. As the pressure increases in the system the pressure differential on opposite sides of the diaphragm 66 will be progressively reduced, thus permitting the valve 38 to move progressively upwardly, whereby the upper end of the valve head tends to follow the upper limit of the port 43 to disconnect the system from the atmosphere. If the operator continues to slowly depress the accelerator pedal, the valve 29 will continue to move progressively upwardly, while the same action takes place with respect to the valve 38, but the upper end of the head 40 will lag behind the upper limit of the port 43, thus permitting the continued introduction of air into the power device until pressure equalization on opposite sides of the diaphragm 60 is reached, at which time the clutch elements are in complete operative engagement.

The rate at which air is admitted into the power device obviously will be determined by the rate of opening movement of the throttle. As the throttle opens more rapidly, the valve 29 moves upwardly at the same rate, thus maintaining a larger effective opening of the port 43 than when the accelerator is depressed more slowly. Accordingly it will be apparent that the rate at which the clutch elements are brought into operative engagement will be dependent upon the rate of throttle operation. It likewise will be apparent that the point at which the movement of the clutch elements will be initially checked is dependent upon the mode of operation of the accelerator. If the accelerator is initially depressed relatively slowly, the movement of the clutch elements will be checked approximately at the point of initial engagement. If the operator desires to get under way more rapidly, he may depress the accelerator pedal more rapidly, in which case the more rapid upward movement of the port 43 with respect to the valve head 40 will cause the latter to travel somewhat further before closing the port 43 and disconnecting the power device from the atmosphere, and accordingly the checking of the clutch elements will occur later.

As fully disclosed in my prior patent referred to, the main valve mechanism also functions to release the clutch plate pressure as the throttle approaches closed position, under normal conditions, thus rendering complete clutch disengagement much more rapid when the accelerator is fully released. As the accelerator is progressively released in the range of movement adjacent to the idling position, the cam portion 37 will travel over the head 33, thus gradually moving the valve 29 downwardly. This operation affords progressive slight communiction between the passage 44 and port 52, while the port 43 will be arranged below the upper limit of the valve head 40. Thus the vacuum in the intake manifold acts slowly before the idling position is reached to build up a pressure differential on opposite sides of the diaphragm 60, tending to disconnect the clutch. The pressure differential will be insufficient to completely disengage the clutch, however, until the throttle reaches idling position. If, during movement of the throttle toward idling position its movement should be stopped before the idling position is reached, there will be no further downward movement of the valve 29, and the continued gradual reduction in pressure in the passage 53 will be communicated to the lower diaphragm chamber 65 to move the valve 38 downwardly and thus disconnect the power device from the vacuum.

Thus it will be apparent that the clutch plates will not be released to a greater extent than the accelerator pedal is moved toward idling position, and since engine speed and torque are reduced as clutch plate pressure is reduced there will be no tendency for the clutch to slip. The resulting action is comparable to the "riding" of the clutch but this is of no consequence since the throw out bearings of present day clutches are adapted to withstand such action. If, in a given engine speed, the torque load should increase, the operator will compensate for this by further depressing the accelerator pedal to hold the same engine speed, and the further opening movement of the throttle thus moves the valve 29 upwardly and admits air into the power device through port 43 while disconnecting the power device from the intake manifold. The clutch plate pressure thus will increase in proportion to the engine torque, and slippage of the clutch will be prevented.

While the previously described operation of shifting gears and then depressing the accelerator pedal has been described with relation to low gear, it will be apparent that all of the various operations take place regardless of the position of the gear shift lever. For example, if the gear shift lever is in low gear and the accelerator pedal is depressed to accelerate the engine and to secure partial or complete clutch engagement and thus cause the vehicle to travel forwardly, traffic conditions may require that the operator partially release the accelerator before continuing through the gear shifting operations, and the partial releasing of the accelerator pedal will release the clutch plate pressure in the manner previously described. If the accelerator is released to a sufficient extent, clutch engagement will be present only to a slight extent, thus tending only slightly to move the vehicle forwardly. If the accelerator is completely released, the clutch will be similarly released to completely disconnect the engine from the driving wheels.

Moreover, it will be apparent that the rate of clutch engagement depends upon the rate of accelerator operation regardless of the position of the gear shift lever, and accordingly the previously described operation of the clutch takes place in every gear. Thus it will be apparent that after complete clutch engagement has taken place in low gear, the accelerator may be released to effect clutch disengagement, whereupon the gear shift lever may be moved into second gear position. The fact that the clutch plate pressure is progressively released as the accelerator is released causes complete clutch disengagement to take place as soon as the accelerator returns to idling position, thus preventing any drag from being transmitted from the motor to the driving wheels. The operation is repeated for the several gears, and at each shifting of the gears, the previously described disengagement of the clutch takes place. In accordance with conventional operation, the accelerator pedal is preferably depressed relatively slowly when the vehicle is in low gear, while somewhat more rapid depression of the accelerator and engagement of the clutch may take place in second gear since the vehicle will have gained substantial momentum. It further will be apparent that even faster accelerator operation and clutch engagement may take place in high gear due to the even greater momentum of the vehicle. These several results are readily accomplished by the operation of the valve mechanism described.

As stated above, relatively slow or relatively rapid accelerator operation and clutch engagement is under the control of the operator, but this is true only within reasonable limits. It will be apparent that when the vehicle is in low gear, for example, the relatively rapid operation of the accelerator readily may cause clutch engagement to take place too rapidly, considering that the vehicle is at a standstill, and in my prior patent referred to, I have provided a second check valve which is operative upon a substantial increase in pressure in the power device to act as a check on the main valve mechanism to prevent the too rapid increase in pressure in the power device. Such valve permits the operator to control the operation of the main valve mechanism within reasonable limits in accordance with the operation of the accelerator, and beyond such limits, the second check valve takes the controlling of the clutch engagement away from the main valve mechanism and limits to a fixed extent the supply of air to the power device.

The valve 84, among other functions, performs the function of the second check valve referred to in a highly improved manner. Whereas the previously developed second check valve is controlled by the increases in pressure in the power device, the valve 84 is controlled by the partial vacuum in the intake manifold, which in turn, is dependent upon the torque load on the engine. Moreover, whereas the second check valve referred to when operating, limits to a constant rate the admission of air into the power device, the valve 84 graduates the admission of air in accordance with torque conditions.

The pipe 89 is preferably tapped into the main manifold 15, inasmuch as the pressure in such manifold portion fluctuates less than is true of the vertical pipe 16, being more closely related to variations in torque loads. These pressure variations are communicated to the chamber 81, through the pipe 89, while the reduced end portion of the valve 84 is influenced by atmospheric pressure. During the clutch engaging functions of the main valves 29 and 38 the valve 84 does not function if the accelerator is not pressed too rapidly, since under such conditions, the partial vacuum in the manifold 15 and in the right hand end of the chamber 81, as viewed in Figure 3, is sufficient to retract the valve 84 to such an extent that the tapered end 86 thereof permits the flow of air between the opening 82 and the passage 80 at least as rapidly as air will be admitted into the power device through the port 43. Under such conditions, therefore, the valve 84 will vary its position in accordance with fluctuations of the pressure in the manifold 15, but does not affect the operation of the power device.

Assuming that the operator depresses the accelerator pedal relatively rapidly whereby the normal operation of the main valve mechanism would release the clutch elements for operative engagement sufficiently rapidly to cause the vehicle to jerk or lunge, as, for example, in first or second gears, the valve 84 will come into operation to take over the controlling of the power device and render the main valve mechanism inoperative for this purpose. Under such conditions, the relatively rapid operation of the accelerator will cause a sudden and substantial increase in pressure in the intake manifold and this pressure will be communicated to the casing 81 to reduce the differential pressure on opposite sides of the valve 84. The spring 89' will thereupon move the valve 84 toward the left as viewed in Figure 3, to reduce communication between the opening 82 and passage 80. Since the portion of the valve 84 which will thus move past the opening 82 and passage 80 is tapered, the degree to which communication therebetween will be reduced will depend upon the degree of movement of the valve 84, and this movement, in turn, will be dependent upon the increases in pressure in the manifold 15. As previously stated, the pressure in the manifold 15 is proportionate to the torque load, and accordingly it will be apparent that the valve 84 functions under the conditions referred to to control the engagement of the clutch elements in accordance with the torque load.

Thus it will be apparent that the present apparatus provides two control valve mechanisms, one of which operates to provide clutch engagement in accordance with the rate of operation of the throttle, and the other of which operates above a given rate of throttle operation to control clutch engagement in accordance with engine torque. The function of the valve 84 accordingly provides the function of the second check valve referred to in that it prevents too sudden clutch engagement, but this operation goes substantially further in that it provides a graduated rate of clutch engagement in accordance with the conditions present.

In my copending application Serial No. 709,650, I have disclosed a main valve mechanism similar to the corresponding mechanism of the present application and supplemented by an auxiliary valve for smoothing out the operation of the main valve mechanism when the device is used for free wheeling, in a manner to be described. Such auxiliary valve was operable in the chamber similar to the chamber 81 and was responsive to pressures in the manifold 15 to the extent that during the presence of certain pressures within the manifold, the auxiliary valve would operate to restrict the flow of air into the power device. Such valve, however, did not contemplate the uses of the present valve inasmuch as it did not provide for the admission of air at graduated rates in accordance with torque loads. The present valve however, functions to smooth out the operation of the valve mechanism when the device is used for free wheeling.

The device is preferably provided with the electrical circuits shown in Figure 4 to provide selective operations, and when one of these circuits is employed in a manner to be described, the clutch will be released at each releasing of the accelerator pedal 24 regardless of any other conditions. Thus it will be apparent that when the vehicle is traveling in high gear and the accelerator is released, the clutch will be released, thus providing free wheeling or coasting in high gear. In the absence of an auxiliary valve of the type of the valve 84 or the free wheeling valve disclosed in my copending application referred to, the main valve mechanism does not function smoothly under all conditions to provide clutch reengagement. If the vehicle is traveling at a substantial speed, it is necessary when returning to normal operation to accelerate the engine speed rapidly to a point corresponding to vehicle speed, and this point in engine speed should be reached before substantial clutch engagement takes place, otherwise the engine will act as a partial brake to slow down the speed of the vehicle, the operation referred to causing a very perceptible dragging in vehicle speed.

If the present device is employed as a free wheeling unit and the vehicle speed is below a predetermined point, the engine speed may be promptly brought up to a corresponding point by depressing the accelerator pedal to the proper extent without causing a sufficient increase in the manifold pressure to render the valve 84 operative. Under such conditions, clutch reengagement will be controlled wholly by the main valve mechanism. Assuming that the vehicle speed is relatively high, for example, above forty miles per hour, and the operator desires to resume normal driving conditions after having been free wheeling, the rapid depression of the accelerator pedal to a sufficient extent to accelerate the engine speed to a point corresponding to vehicle speed would cause the main valve mechanism to operate to permit air to flow so rapidly into the power device as to permit clutch engagement to take place to a substantial extent before the proper engine speed has been reached. With the present device, however, such operation of the accelerator will result in a sudden and substantial increase in pressure in the manifold, in which case the valve 84 will move to the position shown in Figure 3 and will substantially limit the flow of air into the power device. Thus the main valve becomes ineffective for controlling clutch reengagement, this function being taken over by the valve 84, and the restriction in the flow of air into the power device delays clutch engagement until the engine has had time to accelerate to the desired point. Thus it will be apparent that the valve 84 provides the function of the free wheeling valve of my copending application referred to; that it provides the function of the second check valve of my prior patent referred to, and that it constitutes a substantial improvement over the latter valve in that it provides a graduated clutch engagement in accordance with torque loads when the accelerator is operated relatively rapidly in gear shifting.

The wiring system in Figure 4 is relatively simple and provides selective systems of operation. Assuming that the switch 116 is open and the ignition switch is closed, a circuit will be completed through the solenoid 48 to maintain the valve 47 open at all times except when the vehicle is in high gear and traveling above a predetermined speed. Such circuit includes the battery 90, wire 92, switch 93, wires 95 and 98, solenoid 48, wire 99, switch 100, and grounds 102 and 91. Under such conditions each releasing of the accelerator pedal will effect clutch disengagement, since the inner end of the passage 44 will be in fixed communication with the intake manifold whereby the operation of the power device is dependent wholly upon the operation of the valves 29 and 38. Whenever the valve 29 is moved downwardly for releasing the accelerator, therefore, the clutch will be disengaged.

Assuming that it is desired to use the engine as a brake in high gear, the switch 116 may be left open at all times, and the previously described circuit will remain closed at all times except when the vehicle is in high gear. When the gear shift lever is moved to high gear position, the shift rod 104 opens the switch 100, and the circuit referred to can be completed beyond the wire 99 only through the button 114, or through the switch including the contact 108 and brush 110. When the vehicle is traveling above a predetermined speed in high gear, for example, above 10 miles per hour, the brush 110 will be arranged beyond the contact 108 and the circuit through the solenoid 48 will be broken. The valve 47 thus will be projected to closed position and the releasing of the accelerator pedal cannot affect the power device since the operation of the valves 29 and 38 cannot connect the power device to the intake manifold.

Under the conditions described, the accelerator may be released at any time and the engine will act as a brake in accordance with conventional practice. Assuming that a driver releases the accelerator pedal with the intention of bringing the vehicle to a stop, the vehicle speed will progressively decelerate until the predetermined speed referred to is reached, whereupon the circuit through the solenoid will be completed from wire 99 through wire 107, contact 108, brush 110 and ground 112. The valve 47 will be promptly opened, and since the valve 29 under such conditions will be arranged in its lower position, the clutch will be disengaged, whereupon the vehicle may be brought to a standstill.

If it is desired to employ the device as a free wheeling unit with clutch disengagement occurring at each releasing of the accelerator pedal, it is merely necessary to close the switch 116, in which case the circuit from the wire 99 will remain closed at all times through wire 107, switch 116 and ground 119. The operation of the shift rod 104 or the brush 110 cannot affect this circuit, and the valve 47 will remain open at all times, thus affording constant communication between the inner end of the passage 44 and the manifold so as to connect the latter to the power device upon each releasing of the accelerator pedal.

The button 114 is provided merely for the purpose of allowing the operator to effect declutching at any time when such action would not otherwise occur through the releasing of the accelerator pedal. For example, if the vehicle is traveling in high gear above the predetermined speed of ten miles per hour with the switch 116 open, the brush 110 will be arranged beyond the contact 108 and if the accelerator pedal is released, the clutch will not be disengaged since the valve 47 will be in closed position. If, under such conditions, the vehicle starts to ascend a relatively steep hill, the operator may desire to shift into second gear promptly without waiting for the vehicle speed to decelerate to the point at which the solenoid circuit will be closed by engagement of the brush 110 with the contact 108. It merely is necessary under such conditions for the operator to release the accelerator pedal and depress the button 114 which closes a shunt circuit around the switch 100 and brush 110 by connecting the wire 99 to ground 115 through wires 107, and 113, and through the button switch 114.

From the foregoing it will be apparent that the present device is highly efficient in operation as a clutch control mechanism for gear shifting and for free wheeling. It also will be apparent that the valve 84, operating in conjunction with the main valve mechanism, takes care of several operating conditions so as to provide smooth clutch engagement either when shifting gears or when returning to conventional operation after free wheeling, all jerking or lunging of the vehicle being eliminated.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Clutch control mechanism for a motor vehicle having a motor and a clutch, comprising a power device connected to the clutch, and control mechanism for effecting actuation of the power device to disengage the clutch and for controlling the power device to effect clutch engagement at variable rates, including means for assuming control of the power device to effect clutch engagement substantially in accordance with torque loads on the engine if said control mechanism tends to effect clutch engagement at a rate exceeding a given relation to the torque load on the engine.

2. Clutch control mechanism for a motor vehicle having a motor and a clutch, comprising a power device connected to the clutch, and control mechanism for effecting actuation of the power device to disengage the clutch and for controlling the power device to successively release the clutch elements for movement toward operative engagement, check the movement of the clutch elements at a point prior to full operative engagement, and then effect movement of the clutch elements into full operative engagement at variable rates, including means for assuming control of the power device during the movement of the clutch elements into full operative engagement substantially in accordance with torque loads on the engine if said control mechanism tends to effect clutch engagement at a rate exceeding a given relation to the torque load on the engine.

3. Clutch control mechanism for a motor vehicle having a clutch and an engine provided with a throttle, comprising a power device connected to the clutch, and control mechanism operative coincidentally with the engine throttle for effecting actuation of the power device to disengage the clutch upon closing movement of the throttle and for controlling the power device upon opening movement of the throttle to effect clutch engagement at variable rates, including means for assuming control of the power device to effect clutch engagement substantially in accordance with torque loads on the engine if said control mechanism tends to effect clutch engagement at a rate exceeding a given relation to the torque load on the engine.

4. Clutch control mechanism for a motor vehicle having a clutch and an engine provided with a throttle, comprising a power device connected to the clutch, and control mechanism operative coincidentally with the engine throttle for effecting actuation of the power device to disengage the clutch upon closing movement of the throttle and for controlling the power device upon opening movement of the throttle to successively release the clutch elements for movement toward operative engagement, check the movement of the clutch elements at a point prior to full operative engagement, and then effect movement of the clutch elements into full operative engagement at variable rates, including means for assuming control of the power device during the movement of the clutch elements into full operative engagement substantially in accordance with torque loads on the engine if said control mechanism tends to effect clutch engagement at a rate exceeding a given relation to the torque load on the engine.

5. Clutch control mechanism for a motor vehicle having a clutch and a motor provided with an intake manifold, comprising a differential pressure power device connected to the clutch, and control valve mechanism for controlling communication between said power device and the intake manifold to effect actuation of the power device to disengage the clutch and for controlling the power device to effect clutch engagement at variable rates, including auxiliary valve means for assuming control of the power device to effect clutch engagement substantially in accordance with torque loads on the engine if said control valve mechanism tends to effect clutch engagement at a rate exceeding a given relation to the torque load on the engine.

6. Clutch control mechanism for a motor vehicle having a clutch and a motor provided with an intake manifold, comprising a differential pressure power device connected to the clutch, and control valve mechanism for controlling communication between said power device and the intake manifold to effect actuation of the power device to disengage the clutch and for controlling the power device to successively release the clutch elements for movement toward operative engagement, check the movement of the clutch elements at a point prior to full operative engagement, and effect movement of the clutch elements into full operative engagement at variable rates, including auxiliary valve means for assuming control of the power device during the movement of the clutch elements into full operative engagement substantially in accordance with torque loads on the engine if said control valve mechanism tends to effect clutch engagement at a rate exceeding a given relation to the torque load on the engine.

7. Clutch control mechanism for a motor vehicle having a clutch and a motor provided with an intake manifold and a throttle therefor, a differential pressure power device connected to the clutch, and control valve mechanism operative coincidentally with the throttle for effecting actuation of the power device to disengage the clutch upon closing movement of the throttle and for controlling the power device upon opening movement of the throttle to effect clutch engagement at variable rates, including auxiliary valve means for assuming control of the power device to effect clutch engagement substantially in accordance with torque loads on the engine if said control valve mechanism tends to effect clutch engagement at a rate exceeding a given relation to the torque load on the engine.

8. Clutch control mechanism for a motor vehicle having a clutch and a motor provided with an intake manifold and a throttle therefor, a differential pressure power device connected to the clutch, and control valve mechanism operative coincidentally with the throttle for effecting actuation of the power device to disengage the clutch upon closing movement of the throttle and for controlling the power device upon opening movement of the throttle to successively release the clutch elements for movement toward operative engagement, check the movement of the clutch elements at a point prior to full operative engagement, and then effect movement of the clutch elements into full operative engagement at variable rates, including auxiliary valve means for assuming control of the power device during the movement of the clutch elements into full operative engagement substantially in accordance with torque loads on the engine if said control mechanism tends to effect clutch engagement at a rate exceeding a given relation to tne torque load on the engine.

9. Clutch control mechanism for a motor vehicle having a clutch and a motor provided with an intake manifold, a differential pressure power device connected to the clutch, and control valve mechanism for controlling communication between said power device and the intake manifold and the atmosphere for effecting actuation of the power device to disengage the clutch and for controlling the power device to effect clutch engagement at variable rates, including auxiliary valve means for controlling communication between said power device and the atmosphere for controlling the power device to effect clutch engagement substantially in accordance with torque loads on the engine if said control valve mechanism tends to effect clutch engagement at a rate exceeding a given relation to the torque load on the engine.

10. Clutch control mechanism for a motor vehicle having a clutch and a motor provided with an intake manifold, a differential pressure power device connected to the clutch, and control valve mechanism for controlling communication between said power device and the intake manifold and the atmosphere for effecting actuation of the power device to disengage the clutch and for controlling the power device to successively release the clutch elements for movement toward operative engagement, check the movement of the clutch elements at a point prior to full operative engagement and then effect movement of the clutch elements into full operative engagement at variable rates, including auxiliary valve means for controlling the degree of communication between said power device and the atmosphere for controlling the power device during the movement of the clutch elements into full operative engagement substantially in accordance with torque loads on the engine if said control valve mechanism tends to effect clutch engagement at a rate exceeding a given relation to the torque load on the engine.

11. Clutch control mechanism for a motor vehicle having an engine and a clutch, comprising a differential pressure power device connected to the clutch, and control valve mechanism for disconnecting said power device from the atmosphere and connecting it to a source of pressure differential to disengage the clutch and for disconnecting the power device from the source of pressure differential and connecting it to the atmosphere to effect clutch engagement, an auxiliary control valve for said power device, said auxiliary valve being biased in one direction and being urged in the other direction to a variable extent depending upon the torque load on the engine and being operative for limiting communication through said first named valve between said power device and the atmosphere substantially in accordance with the torque load on the engine.

12. Clutch control mechanism for a motor vehicle having a clutch and a motor provided with an intake manifold, comprising a differential pressure power device connected to the clutch, and control valve mechanism for disconnecting said power device from the atmosphere and connecting it to a source of pressure differential to disengage the clutch and for disconnecting the power device from the source of pressure differential and connecting it to the atmosphere to effect clutch engagement, said valve mechanism including a valve for controlling movement of the clutch elements into operative engagement and further including an auxiliary valve for providing graduated communication through said first named valve between said power device and the atmosphere, and means for positioning said valve in accordance with the degree of vacuum in the intake manifold to limit the rate of clutch engagement in accordance with manifold vacuum.

13. Clutch control mechanism for a motor vehicle having a clutch and a motor provided with an intake manifold, comprising a differential pressure power device connected to the clutch, and control valve mechanism for disconnecting said power device from the atmosphere and connecting it to a source of pressure differential to disengage the clutch and for disconnecting the power device from the source of pressure differential and connecting it to the atmosphere to effect clutch engagement, said valve mechanism including a valve for controlling movement of the clutch elements into operative engagement and further including a tapered valve controlling communication through said first named valve between said power device and the atmosphere, means biasing said valve in one direction, and a conduit connected at one end to the intake manifold and influencing said auxiliary valve to tend to urge it in the other direction in accordance with decreased pressures in the intake manifold.

14. Clutch control mechanism for a motor vehicle having a clutch and a motor provided with an intake manifold comprising a differential pressure power device connected to the clutch, and control valve mechanism for disconnecting said power device from the atmosphere and connecting it to a source of pressure differential to disengage the clutch and for disconnecting the power device from the source of pressure differential and connecting it to the atmosphere to effect clutch engagement, including a valve casing, a tapered valve in said casing controlling communication between said power device and the atmosphere through said control valve mechanism, a spring tending to urge said tapered valve in one direction to limit communication with the atmosphere, and a conduit connecting said valve casing to the intake manifold to urge said tapered valve progressively in the other direction in accordance with progressively decreasing pressures in the intake manifold.

15. Clutch operating mechanism for a motor vehicle having a clutch and an intake manifold, comprising a power device connected to the clutch, and means for rendering said power device operative for disengaging the clutch and for releasing the clutch elements for controlled movement into operative engagement, including means operative through said first named means for assuming control of the rate of clutch engagement when said first named means tends to release the clutch elements for movement into operative engagement at a rate faster than a predetermined rate in proportion to the degree of vacuum in the intake manifold.

16. Clutch operating mechanism for a motor vehicle having a clutch and an intake manifold, comprising a differential pressure power device, and valve means for rendering said power device operative for disengaging the clutch elements and for releasing the clutch elements for controlled movement into operative engagement, including valve means controlled by the degree of vacuum in the intake manifold for assuming control of said power device to determine the rate of clutch engagement when said first named valve means tends to release the clutch elements for movement into operative engagement at a rate faster than a predetermined rate in proportion to the degree of vacuum in the intake manifold.

17. Clutch operating mechanism for a motor vehicle having a clutch and an intake manifold, comprising a differential pressure power device, and valve means for controlling communication between said power device and the intake manifold and atmosphere to render the power device operative for disengaging the clutch and for releasing the clutch elements for movement into operative engagement, including a floating valve movable in accordance with the degree of vacuum in the intake manifold and operative for controlling communication between said power device and the atmosphere when said valve means tends to release the clutch elements for movement into operative engagement at a rate faster than a predetermined rate in proportion to the degree of vacuum in the intake manifold.

18. Clutch operating mechanism for a motor vehicle having a clutch and an intake manifold, comprising a differential pressure power device, and valve means for controlling communication between said power device and the intake manifold and atmosphere to render the power device operative for disengaging the clutch and for releasing the clutch elements for movement into operative engagement, an atmospheric conduit through which said valve means controls communication between said power device and the atmosphere, said valve means including a floating valve controlling communication through said conduit to control the rate of engagement of the clutch elements when said valve means tends to release the clutch elements for movement into operative engagement at a rate faster than a predetermined rate in proportion to the degree of vacuum in the intake manifold.

EDWARD G. HILL.